United States Patent [19]

Lynde

[11] Patent Number: 5,786,849
[45] Date of Patent: Jul. 28, 1998

[54] MARINE NAVIGATION I

[76] Inventor: C. Macgill Lynde, 2789 152nd Ave. NE., Redmond, Wash. 98052

[21] Appl. No.: 796,611

[22] Filed: Feb. 7, 1997

[51] Int. Cl.6 ....................................................... H04N 7/18
[52] U.S. Cl. .......................... 348/113; 348/116; 701/211
[58] Field of Search ................................. 348/113, 115, 348/116; 364/443–462; 359/630, 638; 434/38; 701/211; H04N 7/18

[56] References Cited

U.S. PATENT DOCUMENTS

| | | | |
|---|---|---|---|
| 4,445,118 | 4/1984 | Taylor | 343/357 |
| 5,388,990 | 2/1995 | Beckman | 434/38 |
| 5,477,458 | 12/1995 | Loomis | 364/458 |
| 5,566,073 | 10/1996 | Margolin | 364/456 |
| 5,579,165 | 11/1996 | Michel | 359/630 |
| 5,619,378 | 4/1997 | Schwab | 359/638 |

*Primary Examiner*—Howard Britton
*Attorney, Agent, or Firm*—Ronald M. Anderson

[57] ABSTRACT

Marine binoculars augmented with a computer-generated virtual display of navigation information (hereinafter referred to as "nav glasses") and marine navigation systems employing such binoculars. The computer-generated display is superimposed on the real world image available to the user. Nav glasses also have the components needed to link them to a navigation system computer which is utilized to generate the see-through display of the navigation information. Also, they typically are equipped with instruments such as fluxgate compass and an inclinometer for acquiring azimuth and inclination information needed by the navigation computer and a sensor for measuring any magnification of the field of view. In appropriately configured navigation systems, the nav glasses can be employed to lock onto a moving target, which can then be tracked by onboard radar. The navigation system in which the nav glasses are incorporated also accept inputs from other sources such as a shipboard compass, a GPS, and other navigation aids; and a route planning system. The field of view of the nav glasses is calculated from information obtained from the nav glasses and navigation sensors, and a display manager generates a pre-fetch display of navigation information from the route planning and radar inputs. This pre-fetch display or image extends well beyond the nav glass field of view. Consequently, as the glasses are shifted from side-to-side or up or down, all that may be required to match the virtual display to the real world image is to align a different segment of the pre-fetch image with the actual.

25 Claims, 10 Drawing Sheets

MARINE NAVIGATION I

TECHNICAL FIELD OF THE INVENTION

The present invention relates to novel, improved navigation aids and, more specifically, to marine binoculars augmented with a visual display of navigation information and to marine navigation systems employing such binoculars.

BACKGROUND OF THE INVENTION

Ships and boats at sea need a variety of information in order to navigate safely. This information includes: the vessel's position relative to its planned course; the vessel's position relative to visible navigation hazards such as land masses and other ships; and the vessel's position relative to hidden hazards such as submerged rocks, channel boundaries, shipping lane separation zones, and restricted areas. The mariner acquires this information in a number of ways.

The first is by visual reference. By monitoring the vessel's position relative to known points of land, often with the aid of a compass, the navigator can triangulate the ship's position relative to its intended course. By monitoring other vessels, the navigator calculates whether a course change will be required to avoid a collision. And, by monitoring the ship's position relative to buoys, lights, and other visual aids to navigation, the mariner can also avoid some of the unseen hazards to navigation.

This same information is commonly augmented by radar which also displays the ship's position relative to visible hazards such as land masses and other vessels. In addition, the radar, with input from the ship's gyro or magnetic compass, can more accurately calculate range and bearing and perform collision avoidance calculations.

To best avoid unseen navigation hazards such as submerged rocks, the navigator needs to continuously calculate the absolute geographic position of the vessel and plot that position against a nautical chart on which the hidden hazards to navigation are indicated. This process is greatly facilitated by use of a Global Positioning Systems (GPS) receiver and an Electronic Chart System (ECS). The ECS displays a digital representation of a conventional paper nautical chart. On this chart, the ECS overlays the position of the ship based on input from the GPS. The ECS usually consists of a navigation computer containing an electronic nautical chart (ENC) database, interfaces to navigation sensors such as those identified below, and a fairly high resolution computer display screen.

While the ECS represents a vast improvement over manually plotting the ship's position against a paper chart, it has a number of drawbacks and limitations. The first is that it is often difficult to relate: (a) the information in the electronic chart display (usually oriented course-up) with (b) the real world as seen from the navigator's field of view (often a completely different direction). A second significant limitation is that the ECS requires a color, fairly high resolution (therefore fairly large size) display to be most effective. Many mariners, however, navigate from an open cockpit or a flying bridge conning station. There, the lack of space, glare from direct sunlight, and exposure to the elements limit the utility of an ECS display.

Others have attempted to improve marine navigation by augmenting marine binoculars with information pertinent to navigation. Heretofore, these attempts have been limited to adding only bearing and, in a few cases, distance information. This information is at best of limited utility in identifying hidden obstacles and other unseen hazards to navigation. Furthermore, these products usually split the field of view between the real world image and an image of a compass, using mirrors and normal lens optics. This is awkward and can actually distract from instead of enhance the real world image available to the mariner.

From the foregoing, it will be apparent to the reader that there is a present and continuing need for better aids to marine navigation.

SUMMARY OF THE INVENTION

The need for improved navigation aids has now to a significant extent been satisfied by instruments which embody the principles of the present invention and are referred to hereinafter as "nav glasses."

Nav glasses are, generally speaking, marine binoculars augmented with a see-through, computer-generated overlay or display of navigation information. The computer-generated display is superimposed on the real world image available to the user.

Nav glasses also have the components needed to link them to the navigation computer which is utilized to generate the see-through display of navigation information. Also, they typically are equipped with instruments such as a fluxgate compass and an inclinometer for acquiring azimuth and inclination information needed by the navigation computer. In appropriately configured navigation systems, the nav glasses can be employed to lock onto a moving target, which can then be tracked by onboard radar.

The navigation systems in which the nav glasses are incorporated also accept inputs from other sources such as a compass, a GPS, and other navigation aids; a route planning system; and onboard radar. The field of view of the nav glasses is calculated from information obtained from the nav glasses and navigation sensors, and a display manager generates a pre-fetch display of navigation information from the route planning and radar inputs. This pre-fetch display or image extends well beyond the nav glass field of view. Consequently, as the glasses are shifted from side-to-side or up or down, all that is required to match the virtual display to the real world image is to align a different segment of the pre-fetch image with the actual field of view. This is an important feature of the present invention inasmuch as the just-described approach is much faster then generating a new virtual image each time the nav glasses are shifted. If the field of view lies beyond the boundaries of the current pre-fetch image or overlay, a flag is raised; and a new pre-fetch overlay is generated and aligned with the current field of view.

Once the alignment of the virtual display of navigation information and actual field of view is completed, the virtual overlay is transmitted in digital form to a video output component of the navigation computer and forwarded to the nav glasses where the virtual display is constructed and superimposed on the real world field of view. Also important is a navigation system feature which allows additional, textual information to be added to the virtual display at the option of the user of the nav glasses. The user also has the option of canceling the display of the additional information at any time.

The advantages, features, and objects of the present invention will be apparent to the reader from the foregoing and the appended claims and as the detailed description and discussion of the invention proceeds in conjunction with the accompanying drawings.

DETAILED DESCRIPTION OF THE INVENTION

Figure 1:
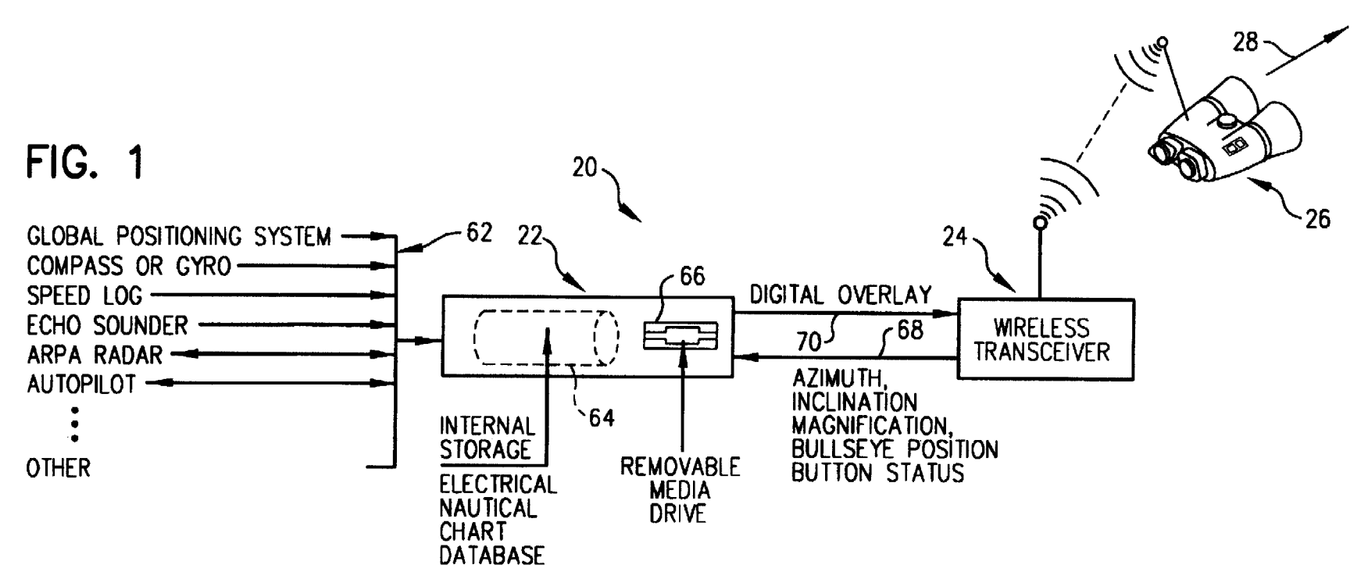
FIG. 1 is a schematic illustration of a marine navigation system which includes nav glasses embodying the principles of the present invention.

Referring now to the drawing, FIG. 1 depicts an onboard navigation system 20 which includes a computer 22, a transceiver 24, and nav glasses 26 which embody, and are constructed in accord with, the principles of the present invention. Nav glasses 26 provide the mariner or other user looking in the direction of arrow 28 with a real world, magnified image of the scene encompassed by the nav glasses field of view. Superimposed on this image is a virtual, see-through display or overlay of navigation information. This information may include, but is not necessarily limited to:

1) azimuth (true)
2) text labels of strategic geographical features on the horizon
3) highlighted symbols indicating positions of navigation aids such as buoys and lights
4) the intended course line and planned cross-track deviation limits
5) safety depth contour lines
6) a "point-and-click" bullseye target finder
7) highlighted symbols indicating positions of ARPA (Automatic Radar Plotting Aid) targets
8) course, speed, closest point of approach and time to closest point of approach for tracked ARPA targets
9) an instrument gauge displaying critical own-ship navigation information such as: heading, speed, bearing to waypoint, cross-track deviation, depth, and rudder angle Nav glasses 26 have conventional binocular optics, and the real world image is formed by those optics in a conventional manner. The virtual display of navigation information is generated by navigation computer 22 and is transmitted to the nav glasses by either the wireless transceiver shown in FIG. 1 or by a conventional data cable 30 (see FIGS. 3 and 5) supplied in lieu of or in addition to transceiver 24.

Figures 2, 3:
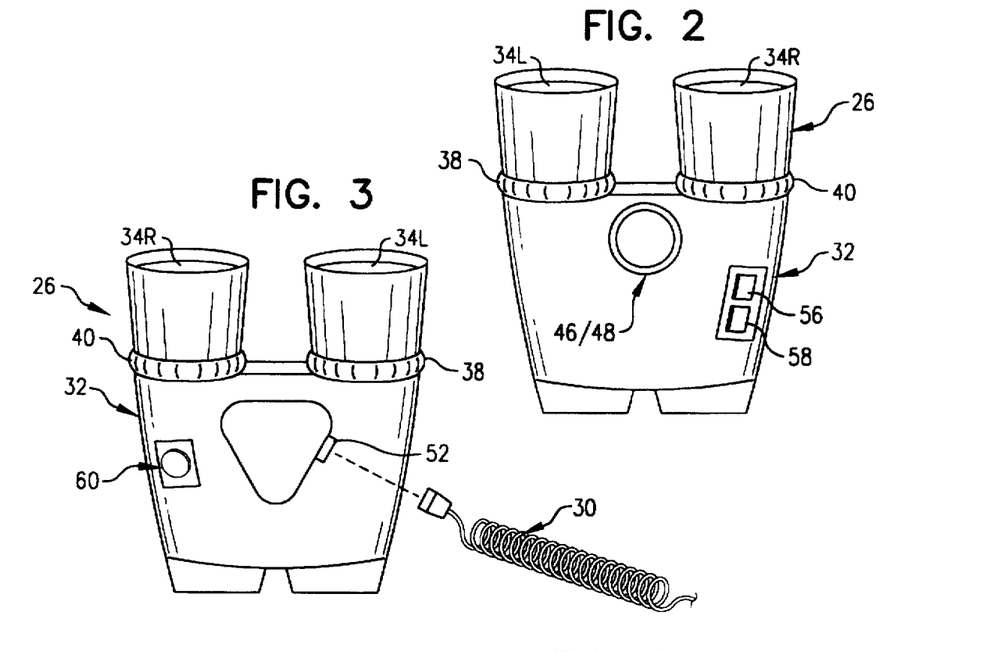
FIG. 2 is a top view of the nav glasses depicted in FIG. 1.
FIG. 3 is a bottom view of the nav glasses.
Figures 4, 5:
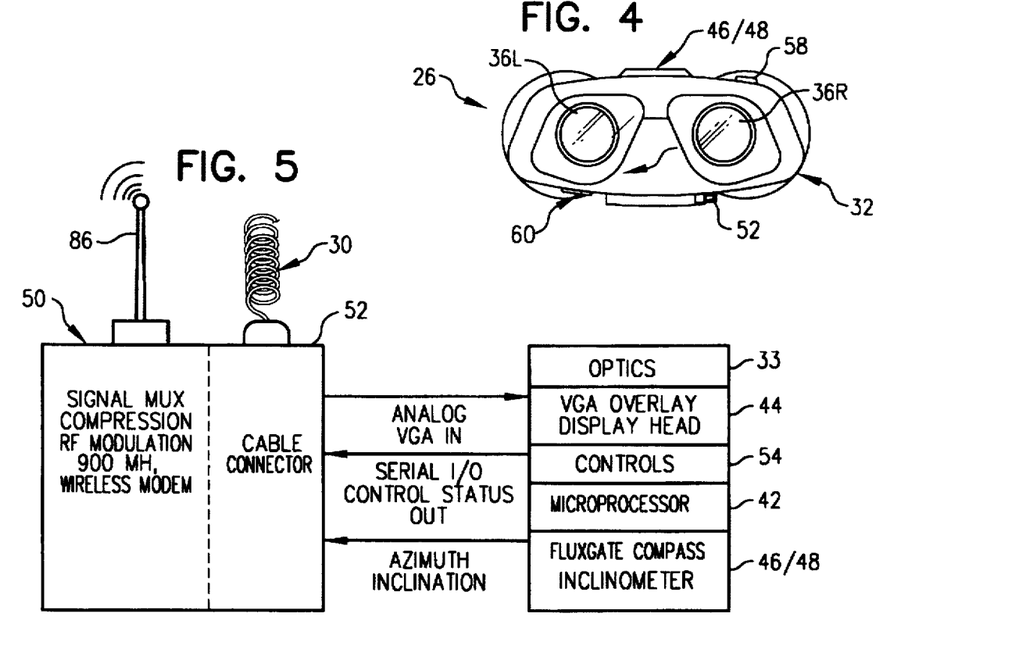
FIG. 4 is an end view of the nav glasses.
FIG. 5 is a block diagram showing the components of the FIG. 1 nav glasses.

Referring now to FIGS. 3–5, nav glasses 26 include a casing 32 which houses the optics that form a real world image of the scene viewed by the user. The optics of nav glasses 26 are collectively identified in FIG. 5 by reference character 33. They include left and right objective lens 34L and 34R (see FIGS. 2 and 3) and corresponding eyepieces 36L and 36R (see FIG. 4). Rings 38 and 40 allow the user of nav glasses 26 to bring the image formed by optics 33 into sharp focus and to change the magnification offered by nav glasses 26.

Also housed in the casing 32 of nav glasses 26, as best shown in FIG. 5, are: (a) a microprocessor 42 which controls the flow of data to and from navigation computer 22; (b) a virtual display head 44 which employs micro LCD's and a beam splitter virtual retinal display techniques, or an appropriate alternative to superimpose the see-through display of navigation information on the real world image generated by binocular optics 33; (c) a fluxgate compass and inclinometer 46/48 or equivalent tracking mechanism; (d) a wireless modem 50; (e) a connector 52 for data cable 30; and (f) a set of controls collectively identified by reference character 54. The controls include push buttons 56 and 58 with programmable functions and a thumb-operated track ball 60. The track ball is employed to position a movable cursor 61 (FIG. 7) on a target selected by the user of nav glass 26. Push button 58 is then clicked, locking the cursor on the designated target. That enables onboard radar to track the target, making available on the virtual display information such as: the course of the target and its speed, the target's closest point of approach, and the time to the closest point of approach.

Nav glasses 26 have two data channels served by the wireless or cable-type data link. These are: (1) a control channel which sends azimuth and inclination information and the current magnification of the real world image to navigation computer 22; and (2) a display channel which receives the computer generated see-through overlay from the navigation computer, typically as a standard VGA-type video signal.

Referring now to FIG. 1, navigation computer 22 includes the following elements:

1) a PC architecture (CPU and system RAM)
2) serial interface ports for receiving navigation information from the GPS and other navigation sensors
3) a control data interface port for receiving azimuth, inclination, magnification, cursor position, and push button status information from the nav glasses
4) a video display controller capable of generating and sending a standard VGA video signal to the nav glasses
5) a hard disk or other long-term storage device for ENC storage and retrieval
6) a removable media drive (e.g., floppy, S-RAM, or CD) used for loading and updating the ENC database
7) software to: (a) process the navigation sensor inputs, (b) process the azimuth and other control signals from the nav glasses, (c) calculate the angle subtended by the current field of view, (d) use the resulting spatial information to retrieve from the ENC navigation information which should be included in the field of view, and (e) generate the see-through display overlay
8) optionally, an available radar interface board which enables the above-discussed target tracking mode of nav glasses 26.

Other sensors may advantageously be interfaced with digital computer 22 to provide to the computer such useful information as rudder angle, engine RPM, propeller pitch, thruster status, and wind force and speed. By interfacing navigation computer 22 both to the GPS and other sensors such as those just described, the see-through display available to the user of nav glasses 26 may also be generated to include a dashboard type of representation with digital emulations of analog gauges, for example an emulation of a tachometer.

The details of the several elements of navigation computer 22 are not relevant to an understanding of the present invention, and they will accordingly not be discussed herein. Thus, the serial interface ports of the navigation computer are shown only schematically and collectively identified by reference 62. These ports input to the computer RAM and/or CPU information supplied by, for example: the Global Positioning System, an onboard compass or gyro compass, a speed log, an echo sounder, ARPA radar, an autopilot, etc. The ENC data storage device is identified by reference character 64 and the drive for the removable data storage device is identified by reference character 66. I/O interface ports between navigation computer 22 and transceiver 24 (or a data cable such as that bearing reference character 30) are identified by reference characters 68 and 70.

Figure 6:
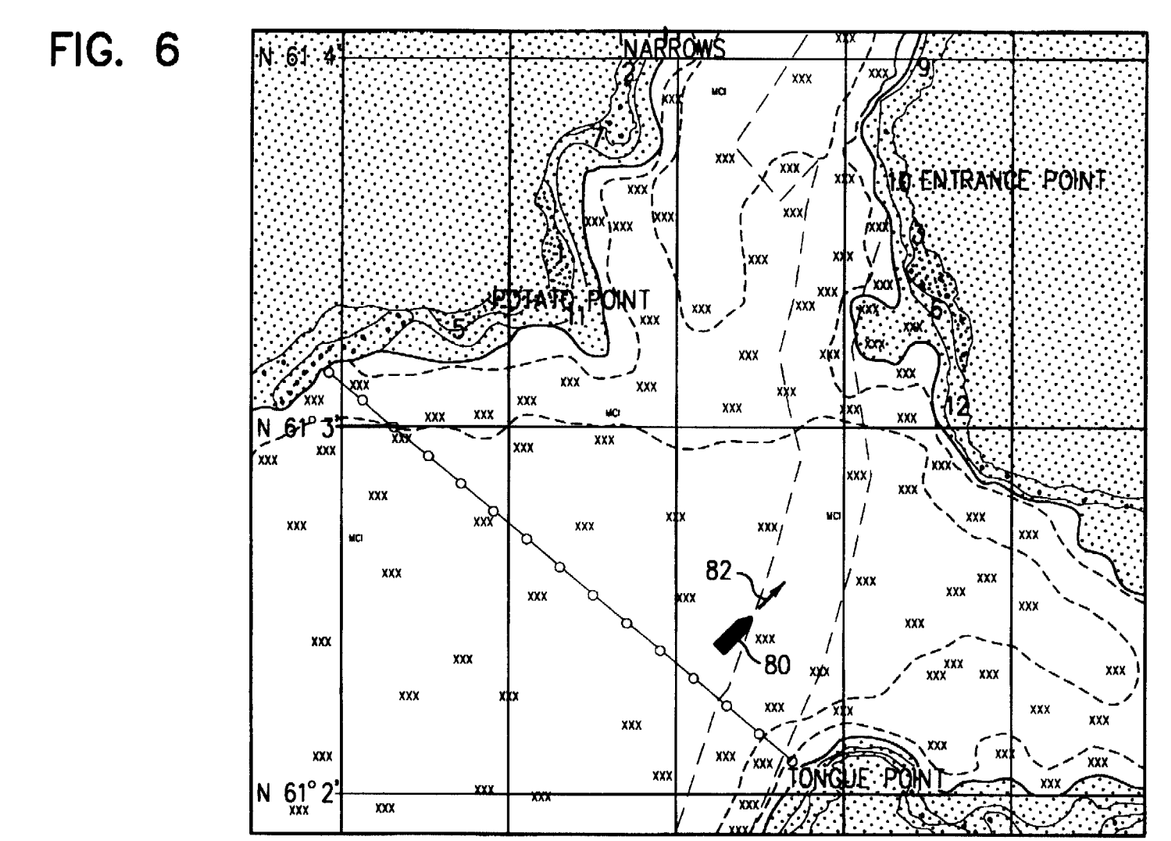
FIG. 6 is a fragment of a conventional marine navigation chart.
Figure 7:
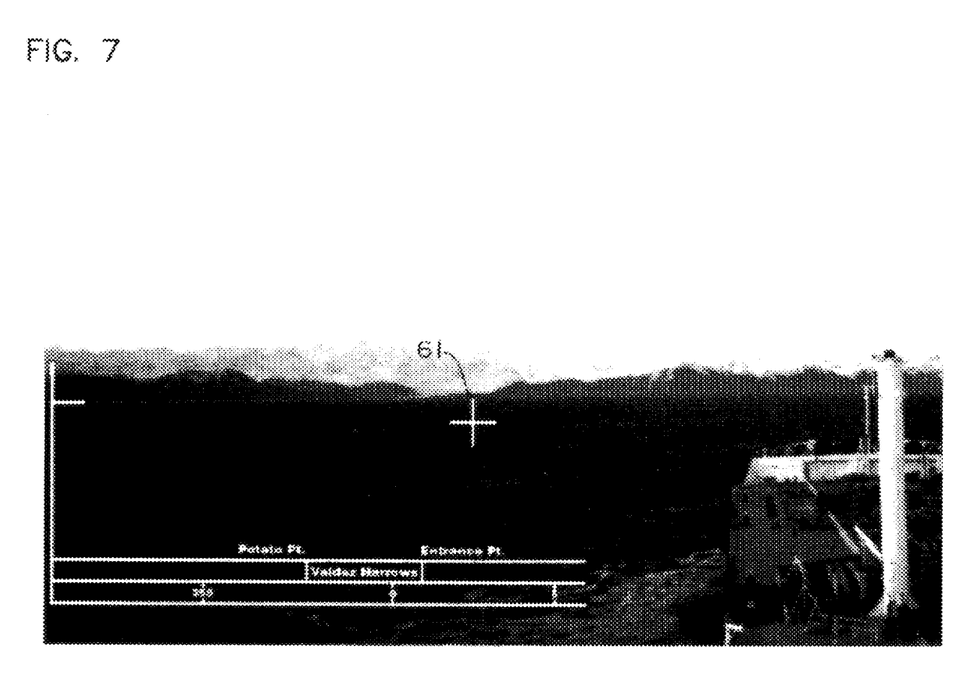
FIGS. 7 and 8 are companion representations of the real world image and virtual overlay available to the user of nav glasses embodying the principles of the present invention.

Referring still to the drawing, FIG. 6 is a fragment 72 of a marine navigation chart covering the Valdez Narrows. FIG. 7 is a pictorial representation 74 of: (a) the real world image 76, and (b) a superimposed, see-through, virtual display 78 seen by a user of nav glasses 26 located at the position identified by reference character 80 in FIG. 6 with the nav glasses trained in the direction indicated by reference character 82. As would be expected, geographical features are readily visible in the real world image as are the manmade structures collectively identified by reference character 83.

In this representative example, information on: (a) the position 80 of the mariner's vessel 84 from the GPS, and (b) azimuth and magnification information from nav glasses 26 is inputted to navigation computer 22; and the ENC database is accessed. Also, if the azimuth is derived from a shaft sensor and is therefore relative, the heading of the vessel, obtained from a magnetic or gyro compass, is inputted to the navigation computer.

Navigation computer 22 then calculates the direction and angle subtended by the field of view of nav glasses 26; extracts from the ENC database pertinent navigation information included within the estimated field of view using available and proven algorithms; and generates a VGA, see-through image displaying the selected ENC text or labels making up see-through display 78.

The VGA image is transmitted from navigation computer 22 via transceiver 24 to the antenna 86 of modem 50, thence to VGA overlay display head 44, which causes see-through virtual display 78 to be superimposed on the real world image 76 generated by binocular optics 33 and seen by the mariner.

Figure 8:
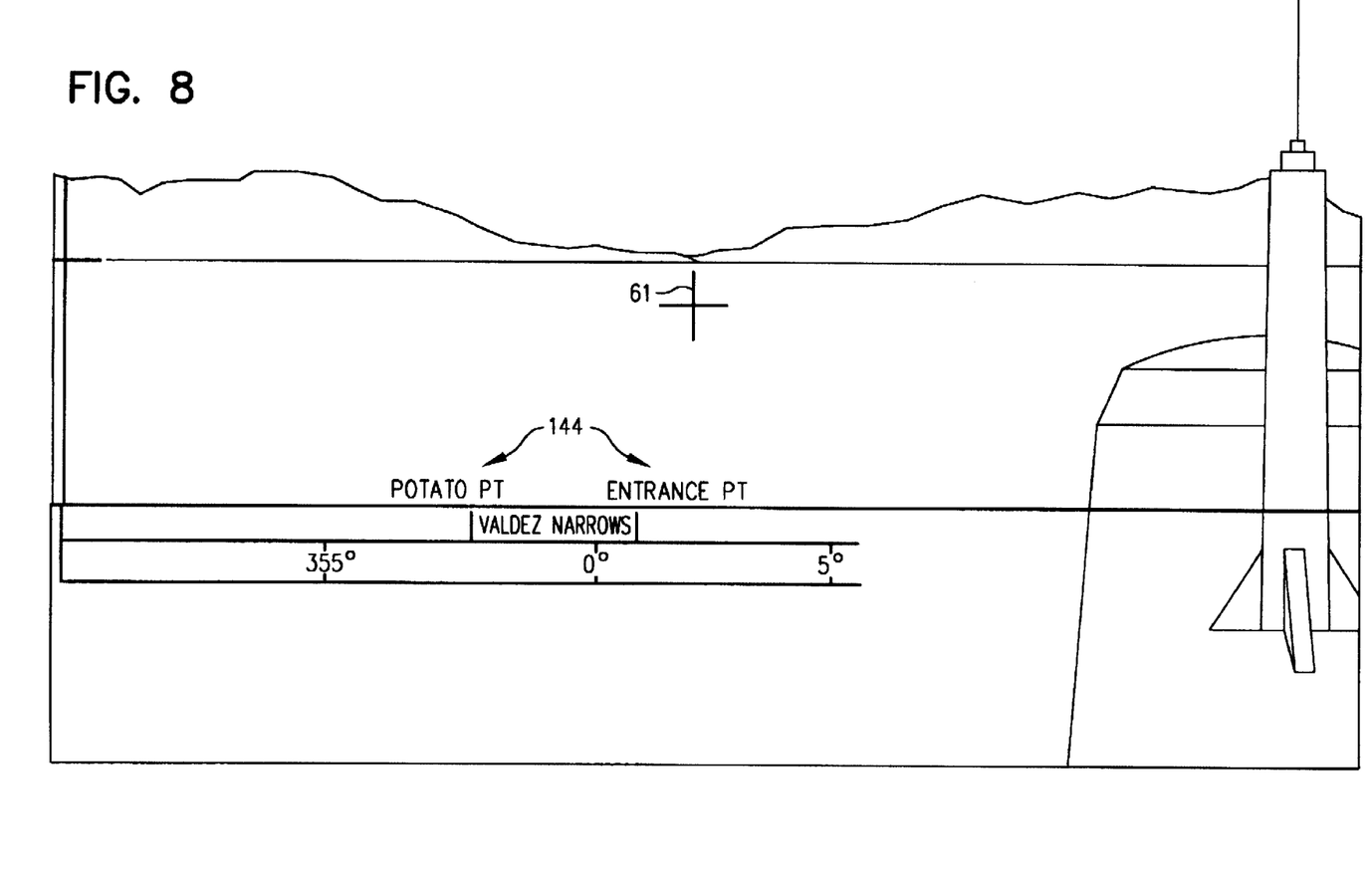
Figure 9:
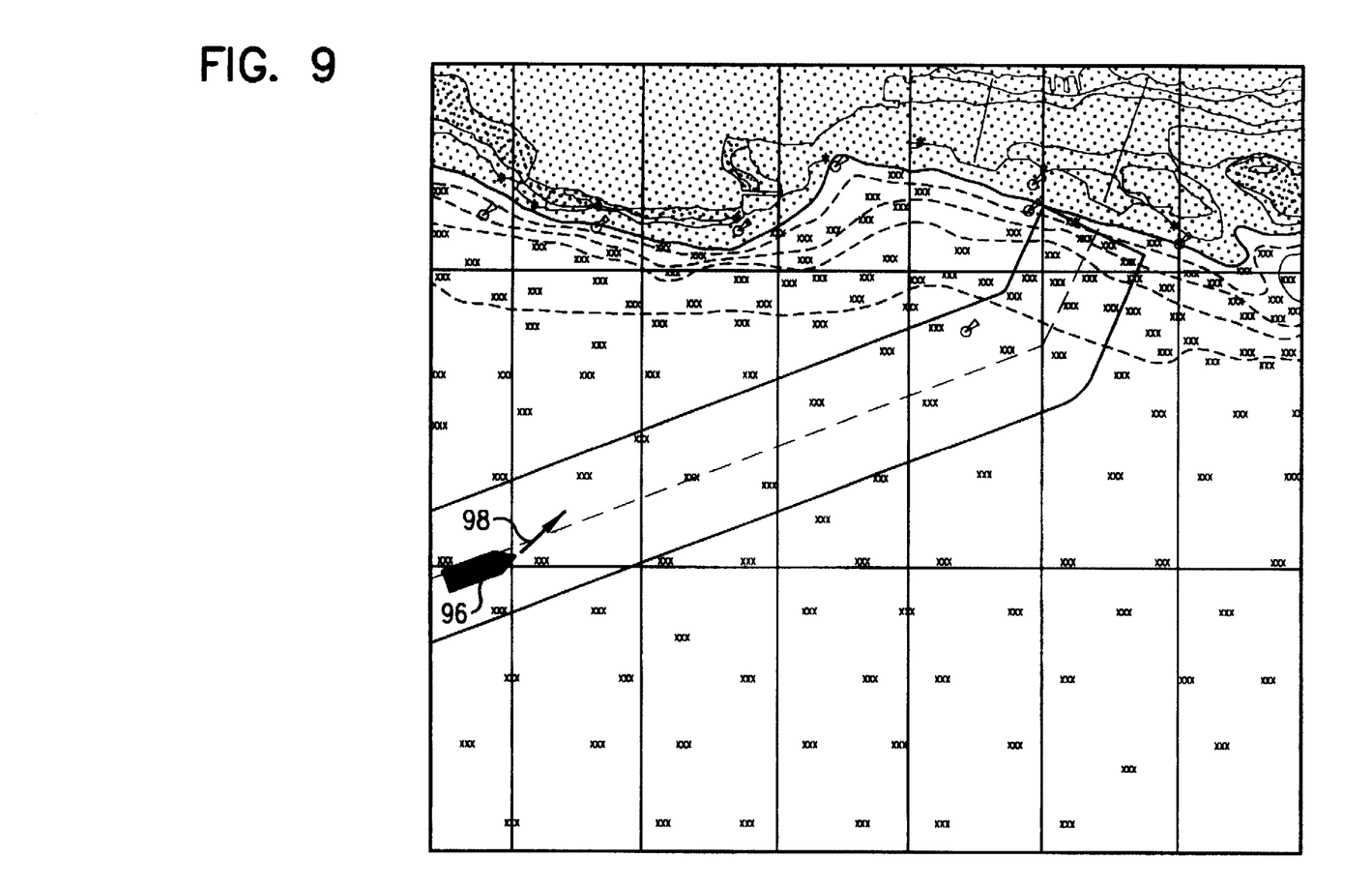
FIG. 9 is a fragment of a second marine navigation chart.
Figure 10:
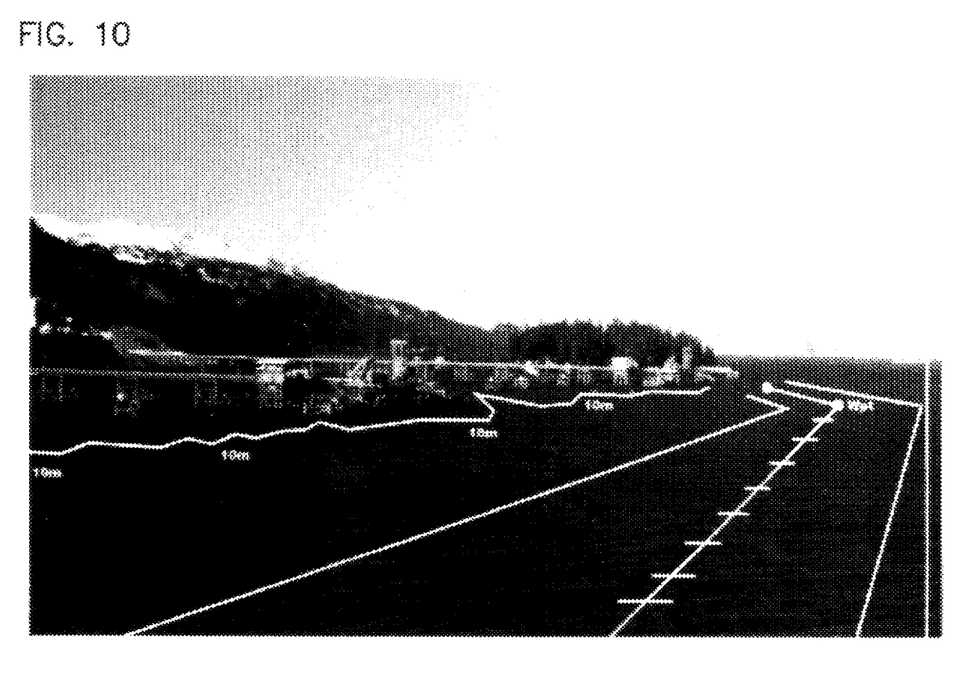
FIGS. 10 and 11 are companion representations of a real world view and virtual display of navigation information available to the user of the nav glasses; in this instance, the virtual display involves a three-dimensional projection of navigation data.
Figure 11:
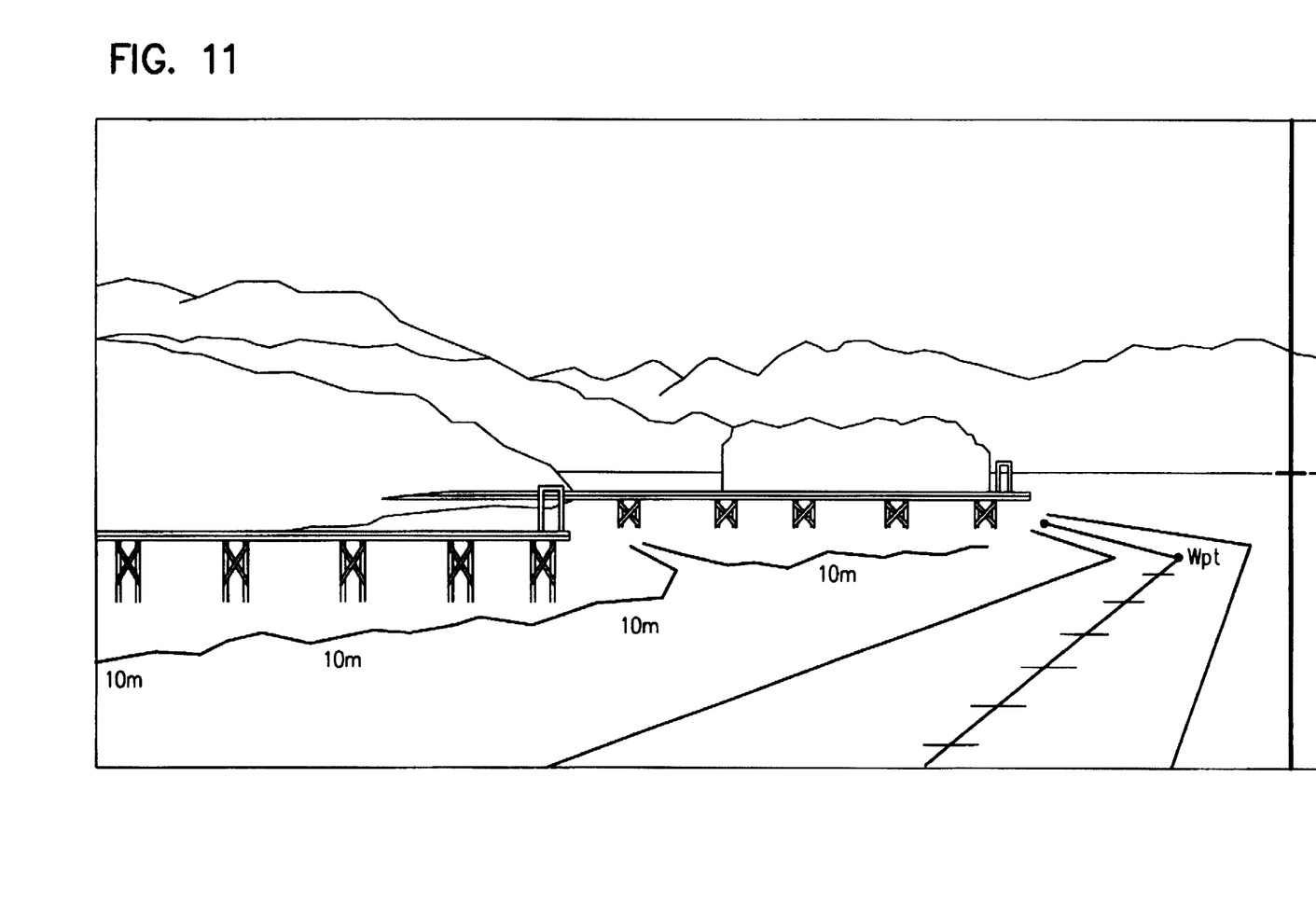

A perhaps more sophisticated application of navigation system 20 is presented in FIGS. 8 and 9. FIG. 8 is a fragmentary navigation chart 88. FIG. 9 pictorially depicts the real world image 90 and virtual image 92 seen by a mariner at position 96 (FIG. 8) with his nav glasses 26 trained in the direction indicated by arrow 98. Natural and manmade geographical features are clearly visible. Also appearing in the mariner's field of view in the form of a see-through display are: the contour line 100 for a water depth of ten meters needed for vessel 94 to proceed in safety, the course 102 to be followed by the vessel to the berth 104 at the end of pier 106, and the allowable limits of cross-track deviation from the course identified by reference characters 108 and 110. In this representative example, therefore, there is a display of navigation data with vectors in all three dimensions to aid in the navigation of vessel 94.

Generation of a see-through virtual display with three-dimensional data as just discussed requires accurate information on azimuth, inclination, and magnification. The requirement for accurate inclination information can be relaxed by providing a tick mark (identified by reference character 112 in FIG. 9) at a vertical edge 114 of see-through virtual display 92. The mariner aligns real world image 90 and virtual display 92 by registering tick mark 112 with horizon 116. This eliminates the inclination information needed for computer 22 to align the real world and virtual images.

Figure 12:
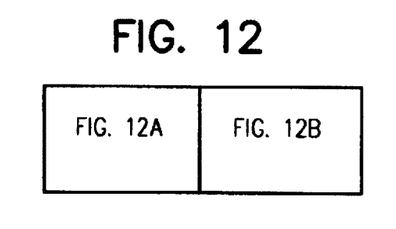
FIGS. 12A AND 12B, taken together, constitute a flow diagram depicting the operation of the FIG. 1 navigation system.
Figure 12A:
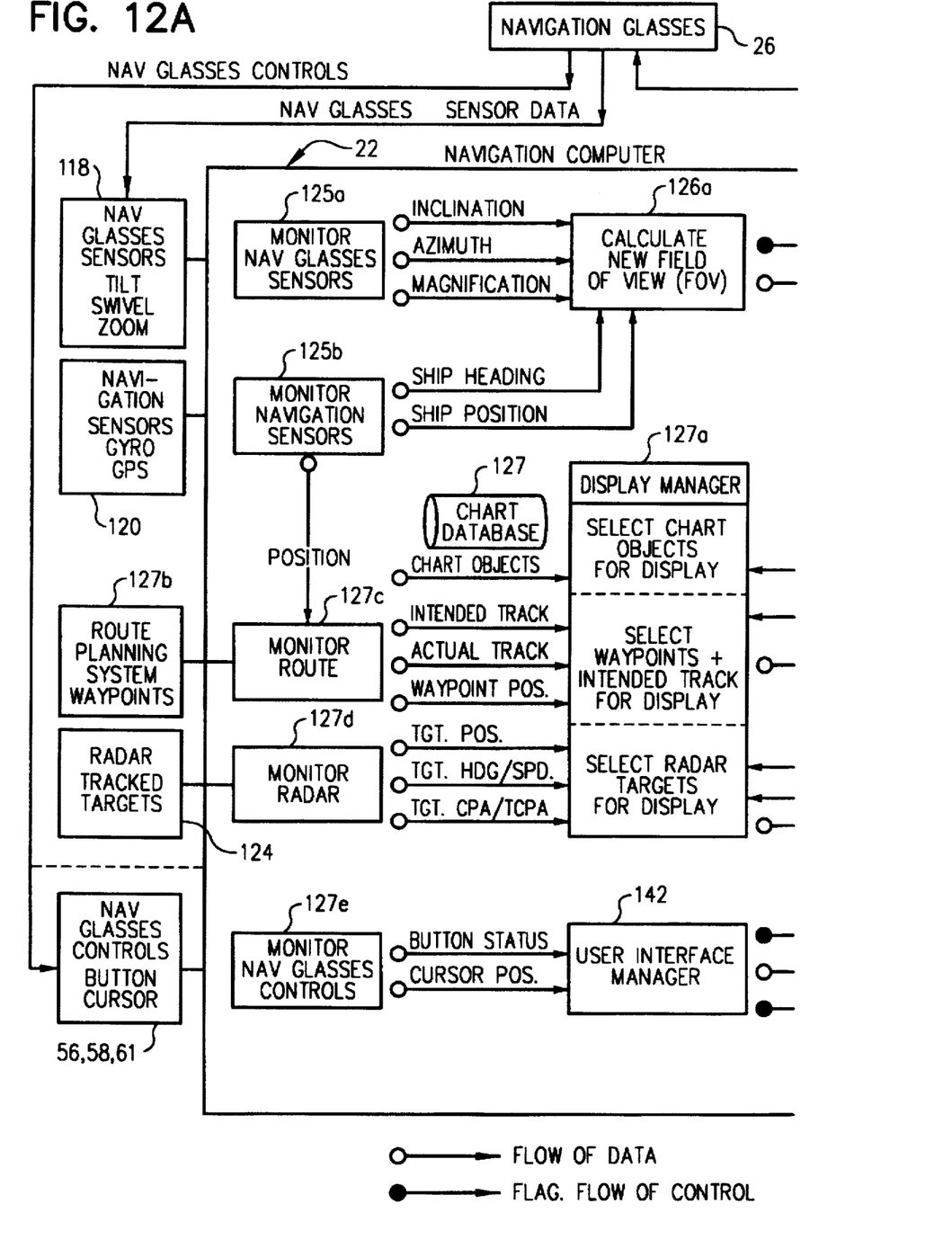
Figure 12B:
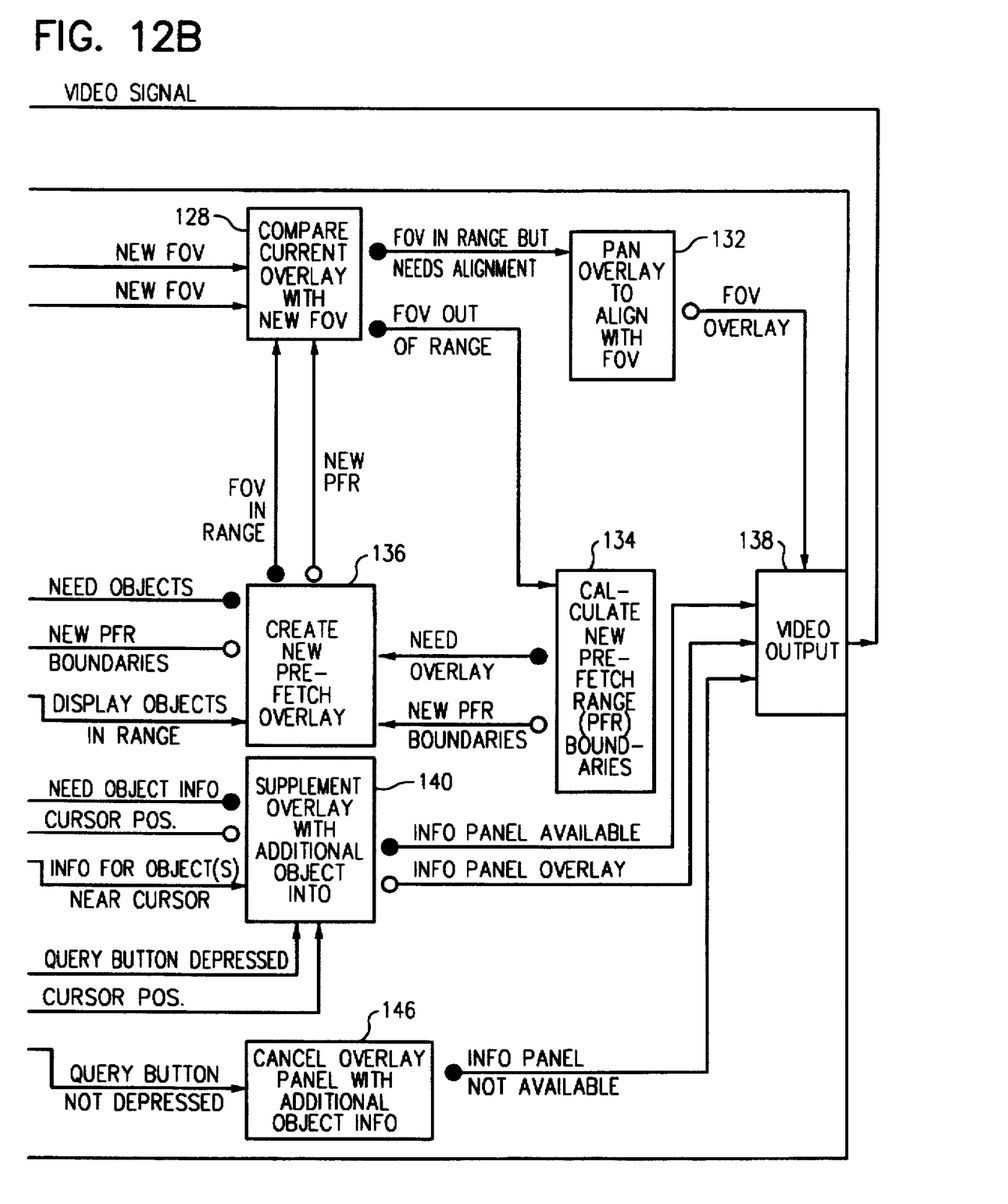

Referring still to the drawings, the operation of navigation system 20 can perhaps best be appreciated by referring to the logic diagram of FIGS. 12A and 12B in which the depicted boxes represent components, states, or functions, the arrows with solid tails represent the flow of control, and the arrows with outline tails represent the flow of data.

Available from navigation glasses 26, as discussed above and shown by box 118 in FIG. 12A, are parameters which describe the orientation of nav glasses 26. These are the inclination of the glasses provided by inclinometer 48, the heading of the glasses from fluxgate compass 46, and the magnification factor determined by the setting of ring 40. This data is transmitted to navigation computer 22 along with ship heading and position data obtained from navigation sensors such as a gyro compass and a global positioning system (GPS) receiver (box 120), route planning information including way points and the intended track of vessel 80 or 96 (box 122); the range, bearing, speed, course, closest point of approach, and/or time of closest point of approach of targets being tracked by radar (box 124), and inputs from the target-selecting cursor 61 which is employed when more information is wanted on a vessel, obstacle, etc. to which the cursor is locked.

Referring now to both FIG. 12A and FIG. 12B, the nav glass sensor inputs are continuously monitored (routine 125a); and the inclination, azimuth, and magnification are computed. The navigation sensors are also continuously monitored (routine 125b), and the ship heading and position are computed from the data supplied by those sensors. From the parameters just discussed—inclination, azimuth, magnification, ship heading, and ship position—the field of view of the nav glasses is continuously calculated (routine 126a).

Concurrently, the virtual overlay or image of navigational information available to the user of nav glasses 26 is generated. Specifically, stored chart information is read from the database 127 in storage device 66 and transmitted to a display manager 127a. Typically, this information will provide the locations of charted objects such as buoys and lighthouses, the contours of coastlines, and depth contours. The virtual overlay generating process also takes information from a route planning system (box 127b) and provides the relevant information to the display manager 127a in computer 22. The information includes the intended track of the vessel, the actual track—which may or may not duplicate the intended track—and a series of way point positions. The actual route of the vessel is monitored by routine 127c.

At the same time, the data relevant to radar tracked targets is monitored (routine 127d) and transmitted to the display manager. As shown in FIG. 12A, this data may include: the position, heading, and speed of the target as well as the closest point of approach to the target and the time to the closest point of approach.

The information supplied to the display manager extends over a pre-fetched range which encompasses the unmagnified field of view of nav glasses 26 but extends well beyond that field in all four directions—left, right, up, and down. This formation of the pre-fetch field is an important feature of the present invention because it minimizes the time required to provide a new virtual display when the user of the nav glasses 26 slews the glasses to a new direction. With the pre-fetch image having already been constructed, all that is required to provide the corresponding virtual image when a new field of view appears in nav glasses 26 is to select the appropriate segment from the existing pre-fetch image. This is a much faster process than building a new image from the information discussed above for the new field of view.

Another function of computer 22, shown in FIG. 12A, is to monitor the controls of nav glass 26; viz., the position of cursor 61 and the status of programmable push buttons 56 and 58 (routine 127e).

Referring now most particularly to FIG. 12B, reference character 128 identifies a routine in which computer 22 determines whether the pre-fetch image encompasses the current field of view of nav glasses 26. If this question is answered in the affirmative, a further determination is made as to whether a new segment of the pre-fetch image is needed to align the virtual display with the current field of view of nav glasses 26. If computer 22 finds that the virtual image and field of view are aligned, the comparison process continues. If alignment is required to match the virtual image to the field of view of nav glasses 26, the pre-fetch image is panned to align the appropriate segment of that image with the actual field of view of the nav glasses as indicated in the block identified by reference character 132. It was pointed out above that this is a much simpler and correspondingly faster process of matching the virtual display to the actual field of view than is the building a new virtual image from the input data discussed above.

In conjunction with the foregoing, the field of view of nav glasses 26 changes when the user of nav glasses 26 adjusts the magnification of nav glasses 26 with magnification ring 40. Computer 22 treats a new field of view attributable to a change in magnification in the same manner as any other new field of view—i.e., one resulting from slewing or changing the inclination of nav glasses 26.

When the comparison routine shown in block 128 determines that a current field of view lies beyond the boundaries of the available pre-fetch image, the boundaries for a new pre-fetch image are calculated (see block 134); and a flag is raised, indicating that a pre-fetch image with new boundaries is needed. The new pre-fetch overlay is created with the routine identified by reference 136. Specifically the new boundaries are transmitted to display manager 126b. The display manager responds by supplying to routine 136 the current data from the sources identified in blocks 118, 120, 122, and 124 and the information from database 127 needed to create the new pre-fetch overlay.

The new pre-fetch image is supplied to the comparison routine (block 128). Because the new pre-fetch image extends beyond the current field of view to the left and right of and above and below the current field of view, routine 128 finds that the current field of view is within the boundaries of the new pre-fetch overlay and passes that information to routine 132 to align the new pre-fetch image with a current field of view.

Once the actual field of view is aligned with the virtual image, the virtual image in coded form is routed to video output 138 of computer 22. The signal from the video output is transferred as by data cable 30 to nav glasses 26. There, the virtual image is formed as an overlay to the real world image by virtual display head 44 under the control of microprocessor 42.

Referring still to FIG. 12B, there are circumstances in which additional information on a virtually displayed object can be beneficial. For example, in a typical scenario involving a navigation light, it may be advantageous to know that the light is red, flashes on a two second cycle, lies eight miles from the vessel equipped with system 22, and locates the entrance to a strait. This information can be provided to a window in the virtual display seen by the user of the nav glasses 26 by invoking the routine identified by reference character 140 as can information on vessels being tracked by radar and other useful navigational information.

In applications of the invention involving the supply of additional object information, one of the nav glasses pushbuttons (for example, pushbutton 58) is programmed as discussed above to function as a query button and the second pushbutton 26 is employed to look cursor 61 onto a selected object or target.

A routine 141 (see FIG. 12A) continuously monitors the position of cursor 61, the status of cursor lock button 56, and the status of query button 58 and reports to interface manager 142 on the status of the pushbuttons and the position of the cursor. If the interface manager finds that the query button has been activated, it raises a flag indicating that this has been done and provides the position of the cursor. Routine 140 then interrogates display manager 127a, retrieving the additional information on the object to which the cursor is locked by the activation of pushbutton 56. With information on that object available from display manager 127a, routine 140 builds an information panel and supplies the data constituting that panel to video output 138. From there the data is routed as by data cable 30 to nav glasses 26. Microprocessor 42 and virtual display head 44 construct the virtual panel identified by reference character 144 in FIG. 8 from the transmitted data and add this panel to the virtual overlay shown in that figure.

The subsequent opening of query switch 58 invokes the routine identified in FIG. 12B by reference character 146. This routine cancels the transmission of the data from which panel 144 is constructed, and video output 138 routes to nav glasses 26 a signal which causes panel 144 to disappear from the virtual display seen by the user of nav glasses 26.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. Apparatus for producing a composite image, said composite image including a real image of a surrounding environment and a virtual image comprising data related to navigation, comprising:

(a) an ocular device for forming the real image, the real image representing a portion of the surrounding environment imaged by the ocular device;

(b) a position sensor that produces a position signal indicative of a position of the ocular device;

(c) at least one orientation sensor that produces an orientation signal indicative of an orientation of the ocular device;

(d) a computer coupled to the position sensor and said at least one orientation sensor to receive the position signal and the orientation signal to determine a field of view of the ocular device, said computer generating a display signal that varies in response to the field of view of the ocular device and changing in response to changes in the position and orientation of the ocular device, said display signal defining navigational data within the virtual image, said navigation data including a navigational route projected on the field of view; and (e) a display that is coupled to the computer to receive the display signal to display the composite image, with the navigational route projected on the field of view.

2. The apparatus of claim 1, wherein the orientation of the ocular device is defined by an azimuth and an inclination of the ocular device.

3. The apparatus of claim 1, wherein position sensor is adapted to automatically determine the position of the ocular device relative to a known position.

4. The apparatus of claim 1, wherein the computer includes a memory for storing the navigational data, said navigational data being referenced to the position and the orientation of the ocular device.

5. The apparatus of claim 1, wherein the virtual image graphically displays navigational hazards that are disposed within the field of view.

6. The apparatus of claim 1, wherein the navigational data are translucent in the composite image.

7. The apparatus of claim 1, wherein the navigation data comprise at least one of text data, video data, picture data, and graphic data.

8. The apparatus of claim 1, wherein the virtual image includes a tick mark for use in defining an azimuth value for the ocular device.

9. The apparatus of claim 1, wherein the ocular device comprises binocular optics.

10. The apparatus of claim 1, wherein the display superimposes the virtual image onto the field of view of the real image to produce the composite image.

11. The apparatus of claim 1, wherein the position sensor is not disposed in the ocular device but is in substantially a same location as the ocular device.

12. The apparatus of claim 1, further comprising a magnification control that varies a part of the real image that is included in the field of view.

13. The apparatus of claim 1, wherein the navigational data include electronic navigational charts, at least a portion of a chart corresponding to the field of view being selectively displayable in the virtual image.

14. The apparatus of claim 13, wherein the computer selectively fetches and displays electronic navigational chart data corresponding to a current field of view on the display in the virtual image, and prefetches additional electronic navigational chart data corresponding to portions of the real image that are adjacent to and outside the current field of view, the additional electronic navigational chart data being immediately accessible and displayable on the display in the virtual image as the field of view changes to include a portion of the real image that was adjacent to the field of view before it changed.

15. The apparatus of claim 14, wherein if the field of view changes sufficiently so that a new field of view extends beyond the portions of the real image to which the additional electronic navigational chart data corresponds, the computer again fetches navigational chart data corresponding to the new field of view and prefetches new additional electronic navigational chart data corresponding to portions of the real image that are now adjacent to and outside the new current field of view, and which are not currently otherwise immediately accessible and displayable on the display.

16. The apparatus of claim 1, further comprising a pointing device that controls a disposition of a cursor in the virtual image.

17. The apparatus of claim 16, further comprising a control usable to selectively lock the cursor on an object in the composite image.

18. The apparatus of claim 17, wherein the computer supplies information about the object on which the cursor has been selectively locked.

19. The apparatus of claim 1, wherein the computer is disposed apart from the ocular device, further comprising a communication link to exchange data with the ocular device.

20. The apparatus of claim 19, wherein the communication link is a cable.

21. The apparatus of claim 19, wherein the communication link is wireless.

22. Apparatus for producing a composite image, said composite image including a real image of a surrounding environment and a virtual image comprising data related to navigation, comprising:

(a) an ocular device adapted to receive light reflected from a surroundings environment to produce the real image, said ocular device comprising:

(i) a housing;

(ii) an orientation sensor that produces a signal indicative of an orientation of the housing;

(iii) a magnification control on the housing that is selectively adjustable to vary a magnification factor to determine how much of the real image comprises the field of view, said magnification control producing a magnification signal indicative of the magnification factor; and (iv) a display for producing the virtual image that is superimposed with the field of view to produce the composite image, the virtual image including navigation data that is related to the field of view, said virtual image being produced in response to a display signal that is input to the display;

(b) a position sensor that produces a position signal indicative of a position of the ocular device;

(c) a computer that stores the navigational data and which is coupled to the ocular device and the position sensor, and is programmed to:

(i) receive the orientation signal, the position signal, and the magnification signal, and as a function thereof, to determine the field of view produced by the ocular device;

(ii) determine which portion of the navigational data that is included in the virtual image, based at least in part upon the field of view;

(iii) generate the display signal for driving the display to produce the virtual image, said computer changing the display signal in response to changes in the orientation signal, the position signal, and the magnification signal, to include the portion of the navigational data related to the field of view included in the composite image.

23. The apparatus of claim 22, wherein the computer fetches navigational data related to the field of view and prefetches additional navigational data related to portions of the real image that are adjacent to the field of view, so that the additional navigational data are immediately accessible and displayable on the display as the orientation of the housing changes to include said portions of the real image.

24. A method for producing a composite image, said composite image including a real image of a surrounding environment and a virtual image comprising data related to navigation, comprising the steps of:

(a) providing an ocular system to form a real image of a surrounding environment, said ocular system also displaying the composite image;

(b) enabling a user to selectively control a magnification factor to determine a portion of the real image included in a field of view included in the composite image;

(b) determining a position and an orientation of the ocular device;

(c) producing a signal indicative of the field of view, said signal being dependent upon the position and orientation of the ocular device and on the magnification factor;

(d) determining navigational data related to the field of view as a function of said signal; and (e) superimposing the virtual image that includes said navigational data on the real image in the field of view to produce the composite image, the composite image displaying the navigational data relevant to the field of view to the user.

25. The method of claim 24, further comprising the steps of:

(a) fetching the navigational data related to the field of view; and (b) prefetching additional navigational data related to portions of the real image that are adjacent to the field of view, said additional navigational data being thus immediately accessible and displayable if the field of view changes to include the portions of the real image.

* * * * *

UNITED STATES PATENT AND TRADEMARK OFFICE
CERTIFICATE OF CORRECTION

PATENT NO. : 5,786,849
DATED : July 28, 1998
INVENTOR(S) : C. M. Lynde

It is certified that error appears in the above-identified patent and that said Letters Patent is hereby corrected as shown below:

Column 1, line 40     "facilitate" should read --facilitated--

Column 10, line 22,    "surroundings" should read --surrounding--
(Claim 22, line 6)

Signed and Sealed this

Twelfth Day of January, 1999

Attest:

Attesting Officer     *Acting Commissioner of Patents and Trademarks*